United States Patent [19]

Echtler

[11] 4,246,237
[45] Jan. 20, 1981

[54] REACTOR APPARATUS

[75] Inventor: J. Paul Echtler, Pittsburgh, Pa.

[73] Assignee: Conoco, Inc., Stamford, Conn.

[21] Appl. No.: 63,612

[22] Filed: Aug. 3, 1979

[51] Int. Cl.³ .............................................. B01F 3/06
[52] U.S. Cl. ................................... 422/224; 422/233; 422/235
[58] Field of Search ......... 422/224, 225, 229, 232–235

[56] References Cited

U.S. PATENT DOCUMENTS

| 1,992,002 | 2/1935 | Chappell | 422/224 X |
| 3,844,928 | 10/1974 | Geymer | 208/10 |
| 3,998,597 | 12/1976 | Forrest | 422/224 X |

Primary Examiner—William A. Cuchlinski, Jr.
Attorney, Agent, or Firm—F. Lindsey Scott; William A. Mikesall, Jr.

[57] ABSTRACT

A reactor apparatus for hydrocracking a polynuclear aromatic hydrocarbonaceous feedstock to produce lighter hydrocarbon fuels by contacting the hydrocarbonaceous feedstock with hydrogen in the presence of a molten metal halide catalyst.

6 Claims, 1 Drawing Figure

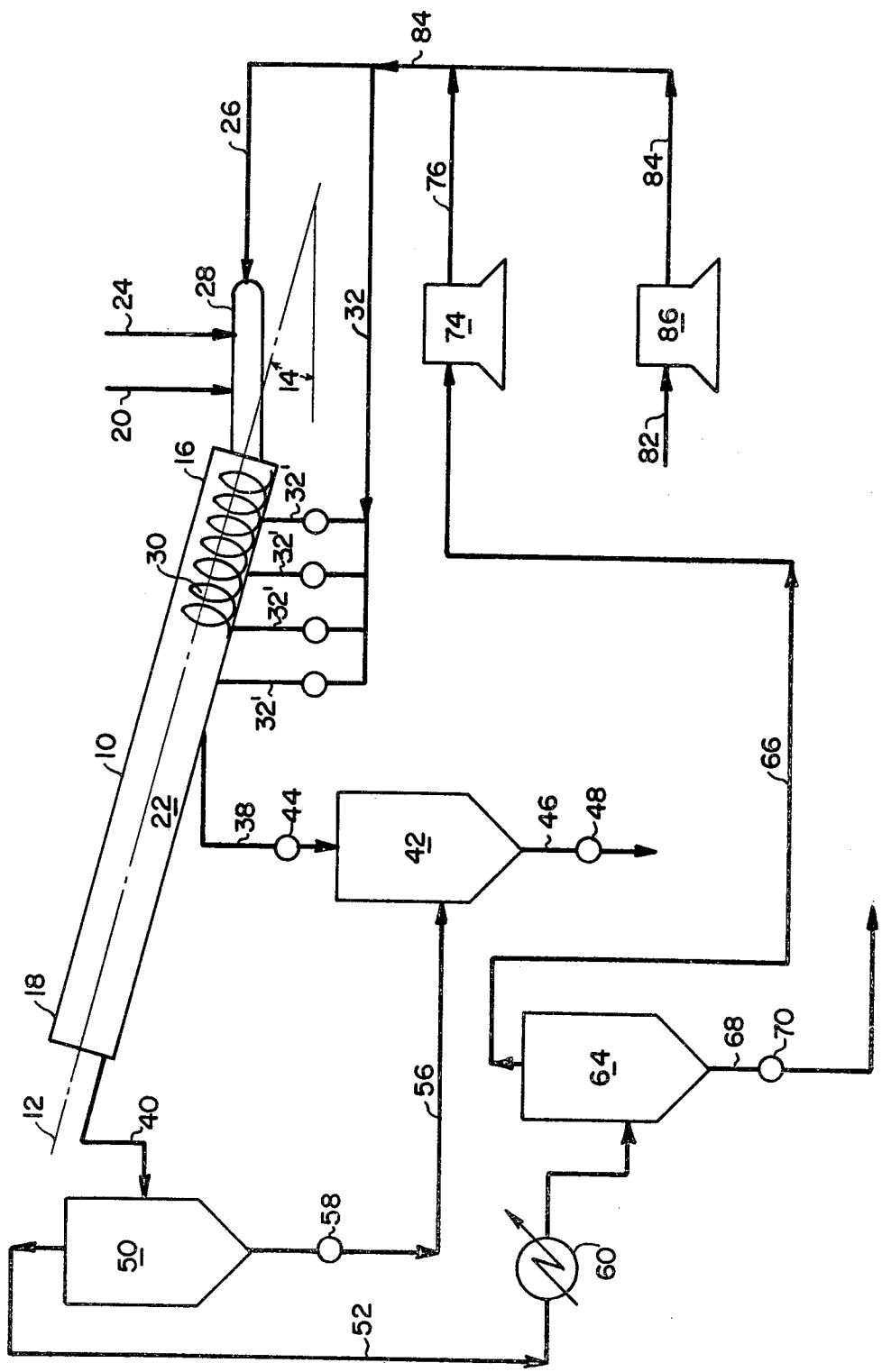

REACTOR APPARATUS

This invention resulted from work done pursuant to a contract with the United States Department of Energy.

This application relates to a reactor apparatus for the conversion of heavy aromatic polynuclear hydrocarbonaceous material into lower molecular weight hydrocarbon fuels by contacting such materials with hydrogen in the presence of molten metal halide catalyst.

As a result of the continuing and well known shortage of petroleum products such as gasoline, diesel fuel, natural gas and the like a continuing effort has been directed to the development of alternative fuel sources which do not depend upon petroleum as a feedstock. In particular a considerable amount of effort has been devoted in recent years to the development of processes which will produce liquid and gaseous hydrocarbon fuels from coal feedstocks. One such process is the reaction of heavy aromatic polynuclear carbonaceous materials such as coal, coal extract and the like with hydrogen in the presence of a molten metal halide to produce gasoline range materials and other lower molecular weight hydrocarbon fuels. Some such processes are shown in the following U.S. Pat. Nos.

| | |
|---|---|
| 3,355,376 | Gorin et al. |
| 3,371,049 | Gorin et al. |
| 3,594,329 | Gorin et al. |
| 3,625,861 | Gorin et al. |
| 3,629,159 | Gorin et al. |
| 3,708,270 | Beik et al. |
| 3,728,222 | Litchford |
| 3,736,250 | Berg et al. |
| 3,764,515 | Kiovsky |
| 3,790,468 | Loth |
| 3,790,469 | Loth et al. |
| 3,844,928 | Geymer |
| 3,998,607 | Wesselhoft et al. |
| 4,081,400 | Gorin |
| 4,120,668 | Fraley |

These disclosures are hereby incorporated in their entirety by reference. Such processes have used various metal halides with zinc chloride being preferred. In such processes the lower molecular weight product hydrocarbons are normally recovered from the hydrocracking zone either as a gaseous stream or in mixture with the spent molten metal halide. The mixture is then subjected to flashing, distillation, solvent extraction or the like to recovery the product hydrocarbons associated with the spent molten metal halide.

In the practice of such processes it has been found that severe operating problems frequently arise with the respect to the materials used to seal about the shafts or the like used to supply energy to stirrers and the like used in the reaction vessel. Accordingly, since such vessels operate at relatively high temperatures and pressures and contain relatively corrosive materials, a continuing effort has been directed to the design of improved reactors which minimize or eliminate the requirement for power-transmission into the reaction zone. It is desirable however that mixing be provided in the reactor and that the products be recovered from the reactor both as a vaporous product stream and as a liquid stream which contains a portion of the hydrocarbon fuels produced as well as the molten metal halide.

It has now been found that these objectives are accomplished in a reactor apparatus which comprises a generally cylindrical reactor vessel having a first and a second end and a longitudinal axis which is at an angle from about 10° to about 60° from horizontal with the second end of the reactor vessel being higher than the first end of the reactor vessel; means for introducing the carbonaceous feedstock, metal halide and hydrogen into the reaction vessel; a static mixer positioned near the inlet end of the reactor for mixing the hydrocarbonaceous feedstock, molten metal halide and hydrogen; a settling zone positioned in the reactor vessel between the mixer and the second end of the vessel; a liquid reaction product recovery means for recovering a liquid stream from a lower portion of the settling zone; and a product outlet means positioned to remove a vaporous product stream from an upper portion of the settling zone.

The FIGURE is a schematic diagram of an embodiment of the apparatus of the present invention.

In the FIGURE, a reactor 10 is shown having a longitudinal axis 12 which is positioned at an angle 14 from horizontal so that a second end 18 of reactor 10 is higher than a first end 16 of reactor 10. Angle 14 is suitably from about 10° to about 60° although it is preferred that angle 14 be from about 25° to about 40°. An inlet 20 is provided for charging a carbonaceous feedstock to reactor 10 and is normally used to charge a feedstream comprising finely divided coal, coal extract or the like as a slurry in a suitable solvent which may be and desirably is a process stream. Such variations are within the skill of those in the art and need not be discussed further. An inlet 24 is provided for charging molten metal halide to reactor 10 and a hydrogen inlet 26 is provided for charging hydrogen to reactor 10. As shown in the FIGURE a common line 28 is provided for blending the carbonaceous feed, molten metal halide and hydrogen for charging to reactor 10. Clearly many of the lines and vessels shown in the FIGURE will need to be heated to prevent the solidification of the reactants or molten metal halide in the lines, however such techniques are considered to be known to those skilled in the art and are not discussed in detail. It is pointed out that in lines which contain molten metal halide or hydrocarbonaceous materials which solidify at relatively low temperatures such lines should be insulated or if necessary insulated and heated to prevent the solidification of the materials in the transfer lines. The materials charged to reactor 10 through line 28 are passed through a mixer 30 which is positioned and near first end 16 of reactor 10. Mixer 30 is a static mixer and has no moving parts. Such mixers are discussed in *Chemical Engineers Handbook*, John H. Perry, Editor, Third Edition, McGraw Hill Book Company, Inc., 1950, Pgs. 1202-1204. Such static mixers, are available commercially from Kock Engineering Co., Inc., Static Mixing Division, 4111 E. 37th St. North, Wichita, Kans., 67208. As the mixture of feedstock, molten metal halide and hydrogen pass through mixer 30 intimate mixing is accomplished and the reaction begins. A suitable reaction time is provided by the length of mixing section 30 and further reaction time is provided in a settling zone 22 in reactor 10. In settling zone 22, a vaporous phase containing a substantial quantity of the product hydrocarbonaceous fuels is present above a liquid phase which contains quantities of hydrocarbonaceous fuels, heavier hydrocarbonaceous materials and unreacted coal as well as the molten metal halide. The liquid layer is drawn off at a desired rate through a line 38 with flow being controlled by a valve 44 and passed to a vessel 42. The vaporous product is withdrawn through a product outlet line 40 and passed to a product settling vessel 50. In product settling vessel 50 any traces of entrained molten metal halide or liquid hydrocarbonaceous fuels are withdrawn through a line 56 and passed to vessel 42. Flow through line 56 is regulated by a valve 58. The stream flowing through line 56 could optionally be recycled to reactor 10 for further processing or the like. Settler 50 is used primarily to separate liquids which may have been entrained in the stream flowing through line 40 from the vaporous product stream which is recovered from vessel 50 through a line 52 and passed via a condenser 60 to a product separating vessel 64. The stream flowing through line 52 is cooled by condenser 60 so that a desired portion of the stream is liquid. In vessel 64 the liquid is separated from the remaining vaporous products and passed through a line 68, with flow being controlled by a valve 70, to further processing. The remaining vaporous constituents which comprise hydrogen, methane and other difficultly condensed gases are recovered through a line 66 and passed via a compressor 74 back to a line 84 through which hydrogen flows to line 26. As shown in the FIGURE, the stream flowing through line 52 is desirably charged to a lower portion of vessel 64 which is desirably maintained with a liquid level so that the the stream charged from line 52 is intimately contacted with the liquid hydrocarbons. Such contacting is effective in removing quantities of difficulty condensable materials such as methane, ethane and the like from the gaseous stream flowing from vessel 64 through line 66. As indicated previously the product stream recovered through line 68 is desirably passed to further processing.

With respect to vessel 42, the liquid stream collected from line 38 contains quantities of hydrocarbonaceous fuels heavier hydrocarbonaceous materials, unreacted feed material, molten metal halide and the like. This vessel is used primarily as a collecting vessel for accumulating the liquid materials withdrawn from vessel 10 via a line 38. The materials collected are passed through a line 46 and a valve 48 to further processing as known to those skilled in the art. For instance, the materials may be subjected to flashing, solvent extraction, or the like. Many of these techniques are discussed in the references listed hereinbefore. Such treatment is not considered to form a part of the present invention nor is the further treatment of the product stream considered to form a part of the present invention.

Makeup hydrogen is charged to the system via a line 82 through a compressor 80 and line 84. The hydrogen flowing through line 84 supplies hydrogen to line 26 and to a line 32 which is positioned to provide a hydrogen stream to a plurality of hydrogen inlets 32' along the length of reactor 10. This hydrogen is desirably introduced as a fine dispersion through a porous medium or the like. The hydrogen is desirably injected in amounts as required to facilitate the reaction of the hydrocarbonaceous feed to produce lower molecular weight hydrocarbon fuels. While the practice of the present invention contemplates the introduction of all the hydrogen with the feedstream introduced through line 28 or the use of the additional injection points it is preferred that the additional injection points be used.

As known to those skilled in the art, operating conditions in reactor 10 are typically from about 500° to about 875° F. at a pressure from about 500 to about 10,000 psig. Liquid hourly space velocities from about 0.25 to about 4.20 and hydrogen to feed ratios of about 5 to about 50 standard cubic feet per pound are considered suitable. Desirably when zinc chloride is used as the catalyst it is present in an amount equal to at least about 15 weight percent based upon the weight of the hydrocarbonaceous feed material.

The materials used in the construction of vessel 10 are desirably selected from materials such as steel alloys resistant to zinc chloride, hydrogen chloride and hydrogen sulfide. One such alloy is Hastelloy C-276. As indicated previously reactor 10 contains no moving parts, therefore the problem of maintaining the integrity of seals and the like about shafts or the like used to transmit power into the reactor vessel has been eliminated. Further, the positioning of vessel 10 at an angle permits the presence of a relatively large liquid-vapor interface in a relatively small vessel so that the separation of the vaporous product from the liquid phase is readily accomplished. It is believed clear that the reactor of the present invention has provided an efficient and effective method for mixing the reactant materials and separating the reaction products in a way such that no moving parts are required in the reaction vessel.

While the embodiment set forth above is considered preferred it is pointed out that the embodiment shown in illustrative rather than limiting in nature and that many variations and modifications are possible within the scope of the present invention. Many such variations and modifications may be considered obvious and desirable by those skilled in the art upon a review of the foregoing description of preferred embodiments.

Having thus described the invention, I claim:

1. A reactor apparatus for hydrocracking a polynuclear aromatic hydrocarbonaceous feedstock by contacting said feedstock with hydrogen in the presence of a molten metal halide catalyst to produce lighter hydrocarbon fuels said apparatus comprising
    (a) a generally cylindrical reactor vessel having a first and a second end and a longitudinal axis, said reactor vessel being positioned so that its said longitudinal axis is at an angle from about 10° to about 60° from horizontal with said second end of said reactor vessel being higher than said first end of said reactor vessel;
    (b) a feed inlet means for charging said feedstock to said first end of said reactor vessel;
    (c) a metal halide inlet means for charging said molten metal halide to said first end of said reactor vessel;
    (d) a hydrogen inlet means for charging hydrogen to said first end of said reactor vessel;
    (e) a static mixer means positioned in said reactor vessel near its said first end for mixing said feedstock, said molten metal halide and said hydrogen;
    (f) a settling zone positioned in said reactor vessel between said mixer means and said second end;
    (g) a spent metal halide outlet means positioned to remove a liquid reaction product containing said hydrocarbon fuels and said molten metal halide from a lower portion of said settling zone; and,
    (h) a product outlet means positioned to remove a vaporous product stream from an upper portion of said settling zone.

2. The apparatus of claim 1 wherein said hydrogen inlet means comprises an inlet means for charging hydrogen in mixture with said hydrocarbonaceous feed and said molten metal halide to said first end of said reactor vessel.

3. The apparatus of claim 2 wherein a plurality of hydrogen inlet means are positioned along the length of said reactor vessel to inject additional hydrogen into said reactor.

4. The apparatus of claim 3 wherein said product outlet means from said reactor vessel fluidly communicates a product settling vessel means for separating liquid hydrocarbon fuels and spent molten metal halide from said vaporous product stream, said product settling vessel including a liquid outlet and a vaporous product outlet.

5. The apparatus of claim 4 wherein said vaporous product outlet from said settling vessel fluidly communicates a product separating vessel via a product cooling means, said products separating vessel including a liquid product withdrawal means and a vaporous stream withdrawal means.

6. The apparatus of claim 5 wherein said vaporous stream withdrawal means fluidly communicates and hydrogen inlet means via a compressor means for recycling the vaporous stream to said reactor vessel.

* * * * *